Feb. 21, 1961    P. KARNOW    2,972,283
MAGNIFIER UNIT FOR INSTRUMENT DIALS
Filed June 28, 1957

INVENTOR.
PAUL KARNOW
BY
ATTORNEYS

United States Patent Office 2,972,283
Patented Feb. 21, 1961

2,972,283

MAGNIFIER UNIT FOR INSTRUMENT DIALS

Paul Karnow, Philadelphia, Pa., assignor to the United States of America as represented by the Secretary of the Navy Filed June 28, 1957, Ser. No. 668,831

2 Claims. (Cl. 88—24)

(Granted under Title 35, U.S. Code (1952), sec. 266)

The invention described herein may be manufactured and used by or for the Government of the United States of America for governmental purposes without the payment of any royalties thereon or therefor.

The present invention relates to a magnifier unit for instrument dials and more particularly to a magnifier unit for instrument dials giving indications of greater accuracy by eliminating errors due to parallax.

Present arrangements for magnifying the face of an instrument dial usually include a magnification lens mounted in front of the dial. While enlargement of the dial face does occur by the use of this arrangement, the parallax errors normally introduced by the movement of the observer's head are increased due to the additional separation between the lens and dial face. The present invention overcomes the deficiency of such an arrangement and, in addition provides the additional advantages of memory or cursor function as well as convenience in reading a deviation from a selected heading at a given instant. The accuracy of the reading when the invention is used does not depend upon the position of the observer's head due to projection of the dial face and pointer upon a screen which can be read from any position of the observer. Since the images of the dial face and indicator needle are both located in the same plane, parallax is thereby avoided.

An object of the present invention is the provision of a magnifier unit for instrument dials that eliminates parallax errors of reading.

Another object is to provide a magnifier unit for instrument dials permitting increased accuracy in reading of the instrument.

A further object of the invention is the provision of an accessory device for instrument dials providing magnification with constant viewing conditions in sunlight or night darkness and permitting direct unobstructed conventional viewing of the instrument dial with optional magnified viewing when required.

Still another object is to provide an instrument dial accessory device for providing means to read a deviation from a selected heading at a given instant and to permit the reading of instrument graduations to a greater degree of accuracy than possible without the use of this device.

Other objects and many of the attendant advantages of this invention will be readily appreciated as the same become better understood by reference to the following detailed description when considered in connection with the accompanying drawing in which like reference numerals designate like parts throughout the several views wherein.

Figures 1, 2:
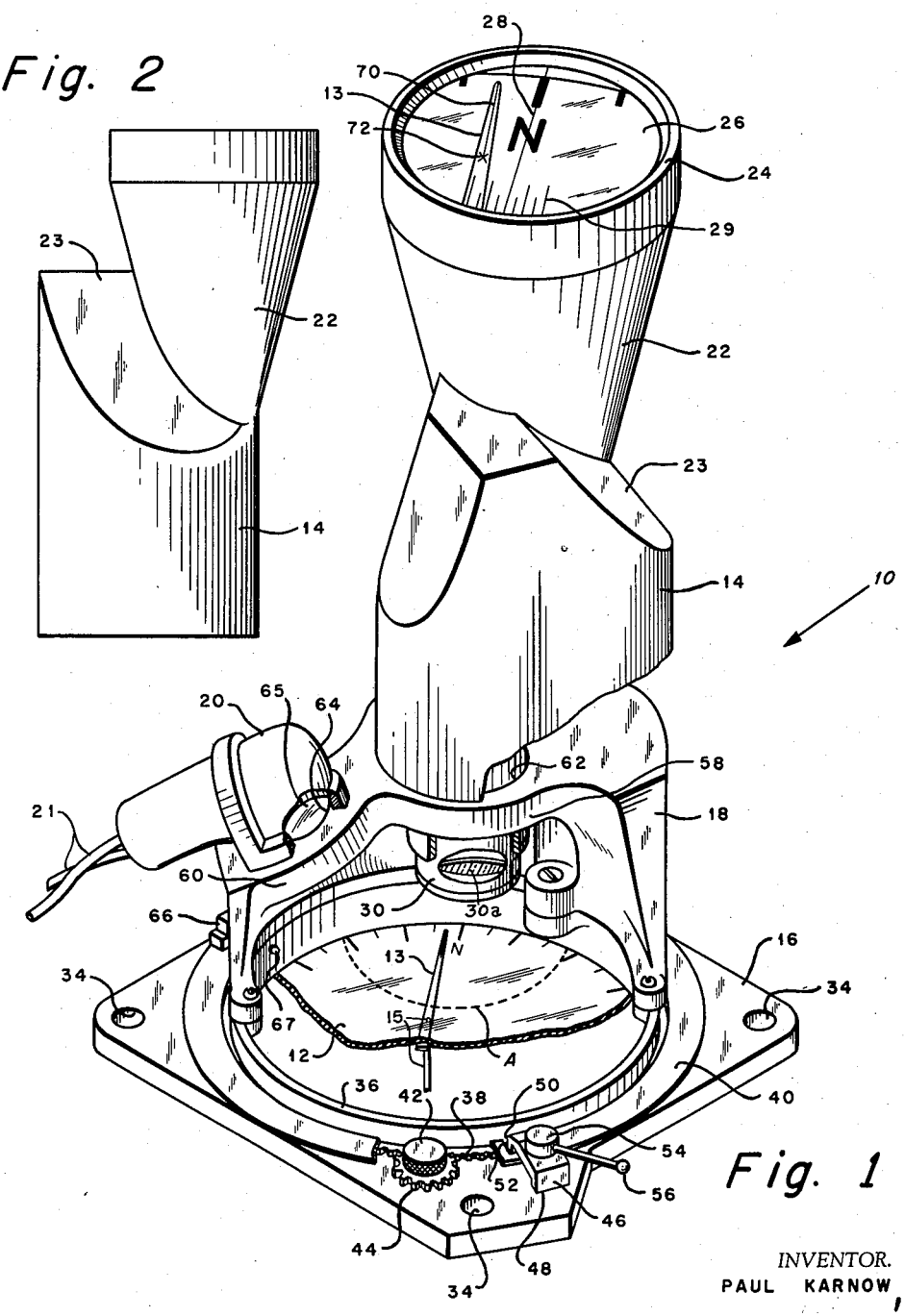
Fig. 1 shows an isometric view of the magnifier unit mounted for use on an instrument dial.
Fig. 2 is a side elevation view of the optical section of the magnifier unit with a lens piece removed.

Referring now to the drawings, magnifier unit 10 is shown disposed over and in operative relation to a conventional aircraft instrument having a relatively fixed dial face and a movable pointer 13. As shown in Fig. 1, dial face 12 is circular and is provided with a peripherally disposed scale. Pointer 13 is mounted for rotation by a pivot shaft 15 located adjacent the center of dial face 12. Shaft 15 forms a part of an aircraft instrument (not shown) fixed in relation to dial face 12 by conventional mounting means (not shown). Magnifier unit 10 consists of the optical assembly 14, a mounting plate 16, a carriage 18, and illuminator 20. Optical assembly 14, also shown in Fig. 2, consists of an outer casing 22 having mounted in its viewing end 24 a ground glass viewing screen 26 containing the reticle cross line 28 and the auxiliary graduations 29. At the opposite extremity of optical assembly 14 is a lens piece 30, including lens elements schematically represented by an elementary lens 30a in Fig. 1, which is adjustable for focusing in the usual manner to pick up the brightened segment A of dial face 12 as hereinafter described. Between lens piece 30 and viewing screen 26 is provided a conventional porro prism system generally designated 23 such as is described and illustrated in "Mirrors, Prisms, and Lenses," by James P. C. Southall, third edition, published by The Maximillan Company, pages 50–51.

Mounting plate 16 is generally flat, with a central opening large enough to accommodate dial face 12 and several holes 34 designed to receive mounting lugs (not illustrated). Within the opening is fitting a ring 36 having gear teeth 38 overlapping the top surface of plate 16. Ring 36 is rotatable with respect to plate 16 which is stationary when mounted. A stationary ring 40 shown partially cut away to permit the illustration of gear teeth 38 is fixed to plate 16 and extends over but does not interfere with the movement of gear teeth 38. A manual knob 42 is fixed to a pinion 44 rotatably mounted on plate 16 engaged with gear teeth 38 of ring 36. Hence, the position of ring 36 may be set or otherwise adjusted by knob 42. A cantilevered clamp 46 screwed or otherwise fastened to plate 16 at 48 extends into contact with a side face of gear teeth 38 at 50 through an opening 52 in cover ring 40. A shaft 54 with a lever 56 permits locking of ring 36 once its position is set by knob 42.

Mounted on the rotatable ring 36 for rotation therewith is the carriage 18 which may be bolted or otherwise rigidly attached thereto. Carriage 18 has the general appearance of a semi-circular segment with a top, transverse wall 58 and an angularly directed wall 60 both of which are flat. Top wall 58 is provided with a circular opening 62 to accommodate lens piece 30 while wall 60 is provided with a circular opening 64 to accommodate illuminator 20 as hereinafter described. Illuminator 20 is constructed of the usual bulb and lens system including lens 65 to throw a concentrated beam of light within the small area on dial face 12 to which lens piece 30 is directed. Thus, walls 58, 60 and holes 62, 64 are arranged so that they converge on a common area on face 12 along the outer edge of dial face 12 to pick up the graduations and pointer 13 if disposed there. A stop device 66 mounted on plate 16 adjacent swiveled support 18 for mating with a stop 67 on the back surface of support 18 prevents the excessive rotation of the device in one direction and hence fouling of electrical leads 21 to illuminator 20. A rheostat (not illustrated) mounted in any convenient location permits adjustment of the illumination on the dial face 12 to its most satisfactory level for the observer. Pointer 13 on dial face 12 may be modified by a cross line 72 intersecting on a center line 70 to serve as a visual aid to indicate that center line 70 is in fact under the reticle 28 on viewing screen 26.

The operation of magnifier unit 10 is as follows:

For the normal use of the instrument having dial face 12 where extreme accuracy is not required, the observer reads face 12 directly, and for this purpose rotates by knob 42 the system away from the position of pointer 13. However, when instrument dial face 12 is being utilized for a critical phase of the operation, such as the launching of a missile at a predetermined heading, where accuracy at the instant of launch is very important, the observer uses the magnifying viewing attachment 10 by unlocking lock lever 54 and rotating the ring gear 36 to place lens piece 30 into position where the heading desired on face 12 appears on the ground glass view screen 26. The observer adjusts the viewing device illuminating system by the rheostat (not illustrated) for adjusting the brilliance to suit visibility conditions. When viewing device 10 is rotated by its set heading knob 42 to the selected heading on dial face 12 so that the selected heading appears, superimposed on reticle 28, he then locks device 54 so as to maintain the viewing device in this position. When instrument pointer is superimposed on reticle 28 of screen 26, the observer knows that the missile is at the correct heading setting. In view of the fact that both pointer 13 and dial face 12 with graduations appear in the same plane on screen 26, there is no possibility of parallax error, no matter how extreme the position which the observer views screen 26. With desirable magnification and suitable illumination, it is apparent that magnifier unit 10 has enhanced the value of the instrument with face 12 to a considerable extent. The auxiliary graduations 29 on the screen 26 when fixed for the particular dial face 12 to which instrument 10 is attached will permit, due to the magnification involved, greater accuracy in the use of the instrument.

It will be seen that the device described above has the advantage that it can be used with any existing instrument without modification to that instrument and without mechanical, electrical or other connections through the instrument. Hence, the reliability of the instrument is not impaired. By providing for initial alignment of the optical system of the device in an optical axis perpendicular to the instrument dial face there is complete elimination of parallax error. Furthermore, it is apparent that the device just described has certain other advantages in addition to magnification, such as the elimination of parallax error, and the greater accuracy in the use of the instrument dial. By providing additional information on screen 26 in the form of additional barrel faces it is possible to provide memory or cursor function. An additional advantage of this device is of course that it provides constant viewing conditions so that the instrument may be read with magnifier in bright sunlight by day or under night flying conditions.

It is thus seen that applicant has provided a novel accessory for use with instrumentation for extracting a much greater degree of utility from existing instrument devices without introducing additional problems which would be involved by redesigning the instruments and dials for accomplishing these functions. Obviously many modifications and variations of the present invention are possible in the light of the above teachings. For example, the device described herein is designed for instruments with movable pointers and the viewing attachment is rotatable around the instrument dial circumference to reach the area selected for reading. On instrument installations where the pointer is fixed and a dial card rotates, the viewing attachment may be fixed and focused directly at the pointer in a manner still permitting direct viewing of the instrument dial face. Of course, in addition, the use of other types of optical systems is possible. Hence, it is therefore to be understood that within the scope of the appended claims the invention may be practiced otherwise than as specifically described.

What is claimed is:

1. For reading an indicating instrument of the type having a pointer movable over a graduated scale spaced behind it, the path of motion of said pointer being parallel to said scale an optical device comprising: carriage means formed to be mounted on the instrument in front of the pointer and the graduated scale, exposing a portion of said scale to direct view lens means secured to said carriage means for magnifying and projecting another portion of the graduated scale and the pointer when indicating therein, a diffusing screen mounted on said carriage means, said screen having a partially reflective planar surface fixed in the focal plane of said lens means for producing an image of said portion of the graduated scale and the pointer on said surface, a reticle inscribed on said surface extending substantially normal to the length of said image of said portion of the graduated scale, a venier scale inscribed on said surface extending substantially parallel to said image of said portion of the graduated scale, the graduation of said vernier scale being related to said image of said portion of the graduated scale so that the position of said image of the pointer on said image of said portion of the graduated scale can be read with greater accuracy, said screen being positioned on said carriage means for viewing said surface from substantially any point located on the side of said screen which is opposite from said lens means; whereby said image of said portion of the graduated scale and the pointer, said reticle, and said vernier scale appear at said surface and are visible from substantially any position off of the optical axis of said lens means without presence of parallax error.

2. A device as set forth in claim 1 further comprising: means secured to said carriage means for illuminating the graduated scale and the pointer, and adjusting means for moving said carriage means about the instrument for selecting the portion of the gradated scale to be magnified and projected.

References Cited in the file of this patent

UNITED STATES PATENTS

| 669,705 | Reeh | Mar. 12, 1901 |
| 2,161,536 | Sordoillet | June 6, 1939 |
| 2,376,445 | Morley et al. | May 22, 1945 |

FOREIGN PATENTS

| 544,938 | Great Britain | May 4, 1942 |
| 626,161 | Great Britain | July 11, 1949 |